US007246220B1

(12) United States Patent
Cheng et al.

(10) Patent No.: US 7,246,220 B1
(45) Date of Patent: Jul. 17, 2007

(54) ARCHITECTURE FOR HARDWARE-ASSISTED CONTEXT SWITCHING BETWEEN REGISTER GROUPS DEDICATED TO TIME-CRITICAL OR NON-TIME CRITICAL TASKS WITHOUT SAVING STATE

(75) Inventors: Hown Cheng, Cupertino, CA (US); Chenhui Feng, Sunnyvale, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 585 days.

(21) Appl. No.: 09/917,312

(22) Filed: Jul. 27, 2001

(51) Int. Cl.
  *G06F 9/48* (2006.01)
(52) U.S. Cl. .................................... 712/228
(58) Field of Classification Search ................ 712/228; 711/120; 713/320, 322; 718/108; 710/260; 703/19
  See application file for complete search history.

(56) References Cited

U.S. PATENT DOCUMENTS

| | | | | |
|---|---|---|---|---|
| 5,561,466 | A * | 10/1996 | Kiriyama | 375/240.25 |
| 5,586,293 | A * | 12/1996 | Baron et al. | 711/118 |
| 5,619,706 | A * | 4/1997 | Young | 710/268 |
| 5,812,868 | A * | 9/1998 | Moyer et al. | 712/23 |
| 5,928,321 | A * | 7/1999 | Ozcelik et al. | 718/1 |
| 5,933,627 | A * | 8/1999 | Parady | 712/228 |
| 5,978,838 | A * | 11/1999 | Mohamed et al. | 709/208 |
| 5,987,592 | A * | 11/1999 | Mahalingaiah | 712/200 |
| 6,012,137 | A * | 1/2000 | Bublil et al. | 712/36 |
| 6,081,783 | A * | 6/2000 | Divine et al. | 704/500 |
| 6,128,641 | A * | 10/2000 | Fleck et al. | 718/108 |
| 6,292,888 | B1 * | 9/2001 | Nemirovsky et al. | 712/225 |
| 6,310,921 | B1 * | 10/2001 | Yoshioka et al. | 375/240.26 |
| 6,378,065 | B1 * | 4/2002 | Arnold et al. | 712/228 |
| 6,473,864 | B1 * | 10/2002 | Chen | 713/300 |
| 6,553,487 | B1 * | 4/2003 | Sukonik et al. | 712/228 |

OTHER PUBLICATIONS

The Authoritative Dictionary of IEEE Standards Terms, Standards Information Network, IEEE Press, 7th Edition, 2000, pp. 767 and 933.*
The Design of the Microarchitecture of UltraSPARC-I; Marc Tremblay, Dale Greenley, and Kevin Normoyle; Proceedings of the IEEE, vol. 83, No. 12, Dec. 1995.*
The Authoritative Dictionary of IEEE Standards Terms, 2000, IEEE Press, 7th Edition, p. 1107.*
Dictionary of Computers, Information Processing, and Telecommunications; Jerry M Rosenberg; 1987; John Wiley & Sons; 2nd Edition; pp. 72 and 509.*

* cited by examiner

*Primary Examiner*—Eric Coleman
(74) *Attorney, Agent, or Firm*—Law Offices of Imam

(57) ABSTRACT

In one embodiment of the present invention, a processing system for processing information efficiently and cost-effectively by switching between execution of time-critical and non-time-critical tasks includes a processing unit. The processing system further includes a first register group coupled to the processing unit and including a first set of registers, the processing unit reading the status of the first set of registers to execute time-critical tasks. The processing system further includes a second register group coupled to the processing unit and including a second set of registers, the second register group for updating the status of the second set of registers, the processing unit reading the status of the second set of registers to execute the non-time-critical tasks by avoiding saving the status of the first set of registers, wherein the processing unit switches between executing time-critical tasks and non-time-critical tasks efficiently and cost-effectively by avoiding saving status of the first or second set of registers.

21 Claims, 4 Drawing Sheets

ARCHITECTURE FOR HARDWARE-ASSISTED CONTEXT SWITCHING BETWEEN REGISTER GROUPS DEDICATED TO TIME-CRITICAL OR NON-TIME CRITICAL TASKS WITHOUT SAVING STATE

BACKGROUND OF THE INVENTION

1. Field of the Invention

The present invention relates generally to the design of multi-task processors and particularly to the design of processors employing hardware-assisted context switching to perform a plurality of tasks.

2. Description of the Prior Art

Modern electronic devices such as integrated circuit devices often include systems for performing a multiplicity of tasks. For example, a system on an integrated circuit device may perform audio and video compression and decompression. Alternatively, an electronic device such as a personal computer may include a processor for performing a multiplicity of tasks. In general, such electronic devices include one or more processors representing a multi-task system.

Conventional multi-task systems operate by switching between the tasks, a process known as context switching. For example, a task may constitute compression of video data, which is a time-critical task, wherein the video engine performing the compression may only wait for time intervals of less than 2 microseconds (1 microsecond=$10^{-6}$ seconds) before requiring additional data. On the other hand, tasks such as user menu display or on-screen display are non-critical tasks wherein up to 2 seconds may lapse before additional data is provided without adversely affecting the quality of display. The processor employed in multi-task systems performs context switching between the tasks with different response time requirements.

Performing context switching includes saving the contents of registers of the hardware (hw) units and the status of resources employed in executing a task. The processor may subsequently perform a completely different task and, upon completion thereof, reinitialize all the saved registers and restore the status of the resources to continue executing the original task.

Hardware units requiring service generally send an interrupt command to the processor. If the interrupt command sent by the hw unit requires performing a time-critical task, the processor performs context switching to provide service to the hw unit. After providing the service, the processor resumes executing the same task that was being executed prior to the arrival of the interrupt command.

In modern electronic devices there are two conventional approaches to executing multiple tasks. In one approach, a single processor is employed to perform both the time-critical and non-time-critical tasks. As some time-critical tasks require a very short response time, a powerful processor operating at high speeds as well as a high-speed real-time operating system are required. However, a more powerful processor is larger and often too expensive for use in an electronic device.

In an alternative approach conventional electronic devices employ two different processors. One processor executes time-critical tasks and the other processor executes non-time-critical tasks. Utilizing two processors, however, requires more extensive hw in the electronic device. In addition, due to differences in speed and power of the processors, two different software (sw) development environments are needed thereby increasing the cost of the electronic device.

Referring now to FIG. 1, a flowchart for executing an interrupt command by a prior art system having a single processor is shown. In a multi-task system a processor executes a plurality of tasks simultaneously wherein each of the tasks is referred to as a thread. Execution of a non-critical thread starts at step 10. The processor receives a hw interrupt 12 from one of the hw units. The hw interrupt 12, alerting the processor to execute a time-critical task causes the processor to stop thread execution and to perform context switching by saving the status of all the registers as well as the real-time operating system (RTOS) resources such as message queue or memory management, as indicated in step 14.

Step 16 indicates interrupt service wherein the processor provides service to the hw unit issuing the interrupt command. For example, interrupt service 16 may include providing additional data to the hw unit by the processor. After providing the service, the processor performs context restore, as indicated in step 18, by reinitializing all the registers and restoring all the RTOS resources to the conditions prevailing prior to the arrival of the hw interrupt 12. Context restore 18 enables the processor to continue thread execution in the same manner as was done before the arrival of the hw interrupt 12, as indicated in step 19.

Context save step 14 and context restore step 18 each may require up to 50 machine cycles for completion. Therefore, context switching requires approximately 100 machine cycles with a typical processor speed of 80 megahertz (1 megahertz=$10^6$ hertz, where 1 hertz is 1 cycle/second) or $1.25 \times 10^6$ seconds.

In light of the foregoing it is desirable to design a single processor to execute both time-critical and non-critical tasks without requiring considerable power and speed. In addition, the processor should operate with a conventional real-time operating system without requiring extensive sw development environment.

SUMMARY OF THE INVENTION

Briefly, a processing system for processing information efficiently and cost-effectively by switching between execution of time-critical and non-time-critical tasks includes a processing unit in accordance with an embodiment of the present invention. The processing system further includes a first register group coupled to the processing unit and including a first set of registers, the processing unit reading the status of the first set of registers to execute time-critical tasks. The processing system further includes a second register group coupled to the processing unit and including a second set of registers, the second register group for updating the status of the second set of registers, the processing unit reading the status of the second set of registers to execute the non-time-critical tasks by avoiding saving the status of the first set of registers, wherein the processing unit switches between executing time-critical tasks and non-time-critical tasks efficiently and cost-effectively by avoiding saving status of the first or second set of registers.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 2:
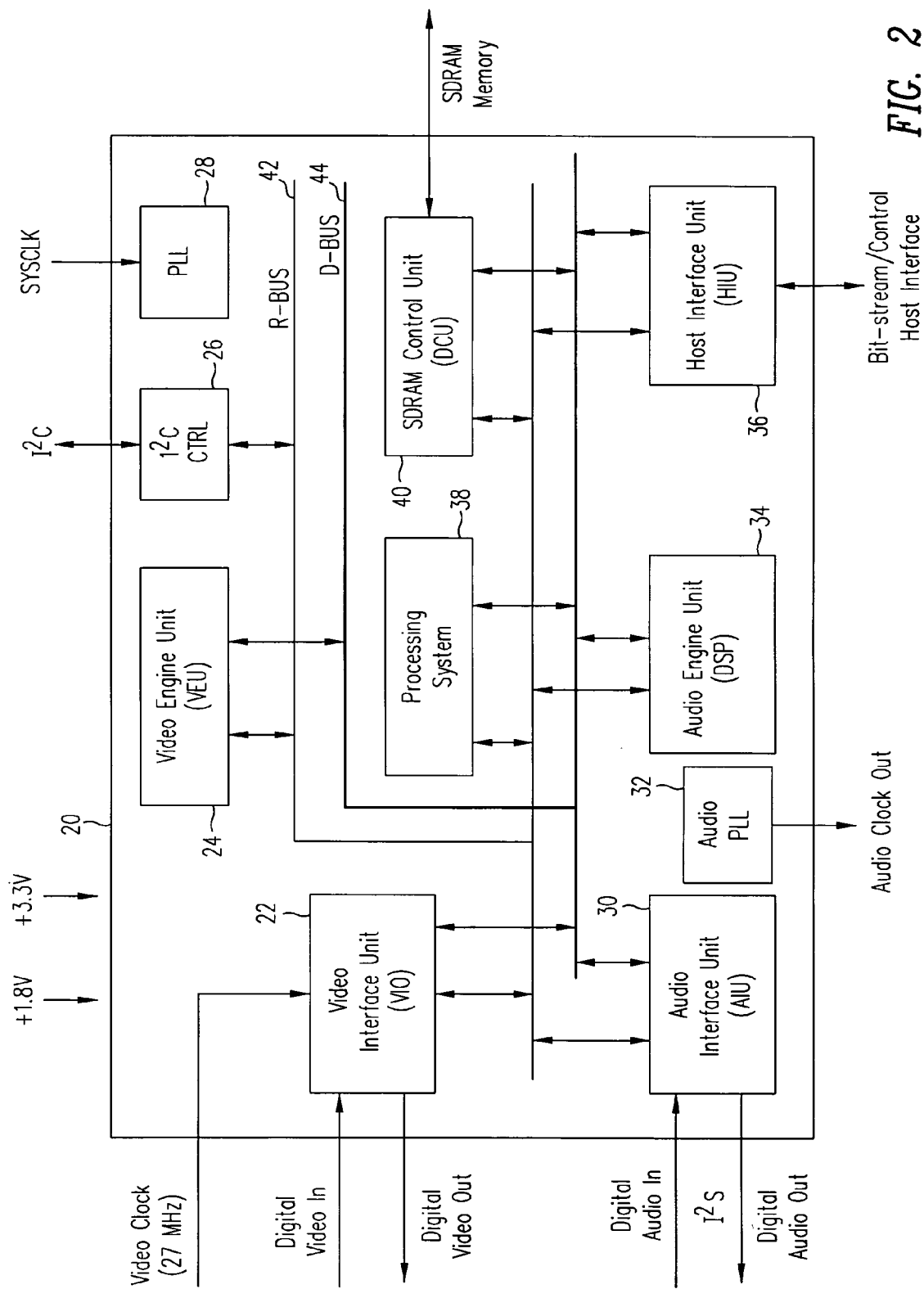
FIG. 2 shows an audio and video encoder/decoder (codec), according to an embodiment of the present invention.

Referring now to FIG. 2, an audio and video encoder/decoder (codec) 20 is shown to include a processing system 38, a video interface unit (VIO) 22, a video engine unit (VEU) 24, an audio interface unit (AIU) 30, an audio engine unit represented by a digital signal processor (DSP) 34, a host interface unit (HIU) 36, and a synchronous dynamic random access memory (SDRAM) control unit (DCU) 40, in accordance with an embodiment of the present invention. Audio and video codec 20 further includes a register bus (R-bus) 42, a data bus (D-bus) 44, a phase lock loop (PLL) 28, an audio PLL 32, and an inter-integrated circuit (I²C) controller 26.

Audio and video codec 20 performs audio and video encoding and decoding for a variety of motion picture expert group 2 (MPEG-2)-based applications used in electronic devices such as super video compact disk (SVCD) recorders and universal serial bus (USB)-based television/video players and recorders. Processing system 38 in one embodiment of the present invention is an ARC core-based processor manufactured by ARC International located in Elstree, UK. Processing system 38 functions as a central controller for audio and video codec 20. In addition, processing system 38 performs multiplexing (combining a number of input signals into one output signal) of audio and video streams to generate an MPEG stream as well as demultiplexing (parsing one input signal into a number of output signals) of an MPEG stream into audio and video streams.

The VIO 22, the AIU 30, the VEU 24, processing system 38, the DCU 40, the DSP 34, and the HIU 36 intercommunicate via the R-bus 42 and the D-bus 44. The D-bus 44 is a 64-bit wide data bus and the R-bus 42 is a 16-bit wide register bus. Audio and video codec 20 receives digital audio and video input and generates digital audio and video output. The DCU 40 provides an interface between the audio and video codec 20 and an external (SDRAM) memory. The HIU 36 enables the audio and video codec 20 to communicate with a host controller and an external memory.

In one embodiment of the present invention processing system 38 executes both time-critical and non-time-critical tasks without requiring considerable power and speed. In fact, processing system 38 executes the time-critical tasks without the need for a real-time operating system, as described in detail hereinbelow.

The HIU 36 is used to communicate with a host controller and an external memory. The HIU 36 provides an interface to USB controllers and may also communicate with a personal computer (PC) host system via a personal computer interface (PCI) bridge. In addition, the HIU 36 is used for input/output of the encoded audio and video streams between the audio and video codec 20 and a host controller. The AIU 30 provides an interface between the audio and video codec 20 and an external audio device by transferring signals using inter-integrated sound (I²S) signaling. The audio PLL 32 provides a user-configurable output clock for external audio analog to digital and digital to analog converters.

The audio engine unit 34, being an embedded, 24-bit, general purpose, programmable DSP, performs audio-related functions. The DSP 34 performs a multiply-accumulate operation in a single cycle with no overhead delay. The DSP 34 also provides automatic translation from 64 to 24 bits. The DSP 34 performs audio encoding and decoding for all popular audio formats, such as Dolby digital and MPEG audio.

The VEU 24 is the video processor core for the audio and video codec 20. During encoding, the VEU 24 operates on preprocessed video data to generate an MPEG-compliant video stream by performing such tasks as motion estimation and compensation. During decoding, the VEU 24 operates on video streams to generate decompressed video data.

The VIO 22 preprocesses the input video data to generate preprocessed video data thereby facilitating subsequent encoding operation. Examples of video preprocessing include spatial and/or temporal pre-filtering for video input noise reduction and inverse telecine for converting the television (TV) format to the film format. The VIO 22 performs a variety of post-processing operations including horizontal and vertical scaling and telecine for converting the film format to the TV format.

The DCU 40 provides an interface between the audio and video codec 20 and an external memory (SDRAM). The DCU 40 sustains transfer of real-time audio and video data for encoding and decoding operations at 30 frames per second. The DCU 40 arbitrates requests from the audio and video codec 20 and generates the necessary control signals for the audio and video codec 20 as well as the external SDRAM. In addition, the I²C controller 26 provides control for external video encoders and decoders. The PLL 28 provides clocking for both the audio and video codec 20 and the external memory.

Figure 3:
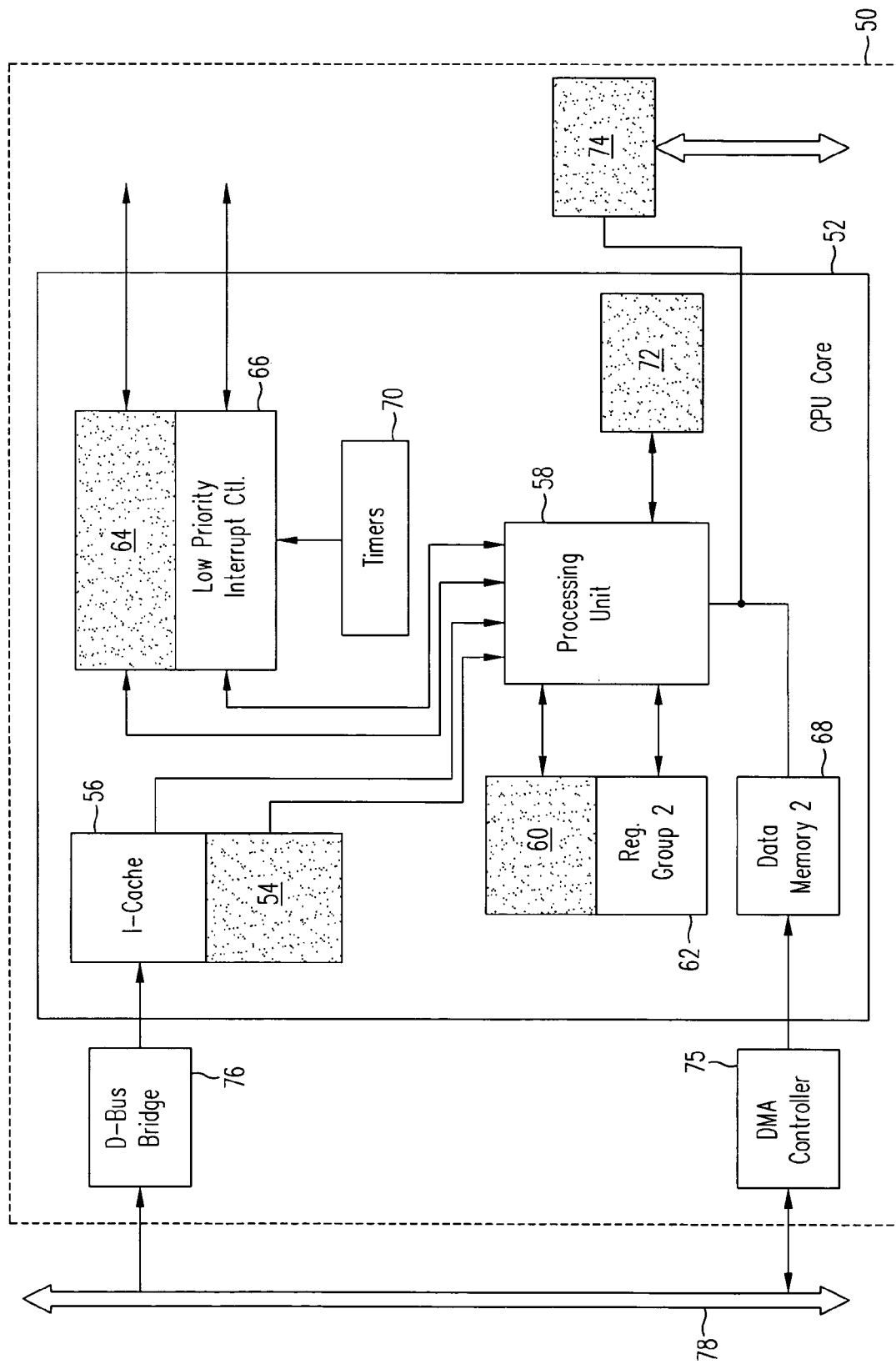
FIG. 3 shows an internal architecture of a processing system, according to an embodiment of the present invention.

Referring now to FIG. 3, an internal architecture of a processing system 50 is shown to include a central processing unit (CPU) core 52, a data-bus (D-bus) bridge 76, a register-bus (R-bus) bridge 74, and a direct memory access (DMA) controller 75, in accordance with an embodiment of the present invention. In addition to processing system 50, a D-bus 78 is also shown in FIG. 3. The CPU core 52 includes a processing unit 58, an instruction cache (I-cache) 56, a code random access memory (RAM) 54, a register group 60, another register group 62, a data memory 72, another data memory 68, a high priority interrupt controller 64, a low priority interrupt controller 66 and one or more timers 70.

The R-bus bridge 74 provides an interface between data memory 68 and other communication systems within the audio and video codec 20 such as the DSP 34, the VEU 24, etc. shown in FIG. 2. The D-bus bridge 76 provides an interface between the D-bus 78 and the I-cache 56. In addition, high priority controller 64 and low priority controller 66 communicate with the communication systems. Within the CPU core 52, the timers 70 communicate with low priority controller 66 while processing unit 58 communicates with register groups 60 and 62 as well as with data memory 72 and 68. In addition, processing unit 58 communicates with the I-cache 56, the code RAM 54, high priority controller 64, and low priority controller (ctl.) 66. The DMA controller 75 transfers data between an external SDRAM and the data memory 68 through the D-bus 78. The timers 70 function as the system timer for a real-time operating system employed in the processing system 50.

In an embodiment of the present invention, processing unit 58 functions as a computational unit including an arithmetic-logic unit (ALU). Processing unit 58 executes both the time-critical and the non-time-critical tasks. Time critical tasks require a very short time interval within which execution of the task should be completed. An example of a time-critical task is providing additional data to the VEU during video compression. Additional data to the VEU should be provided in a time interval less than 2 microseconds (1 microsecond=$10^{-6}$ second). Non-time-critical tasks include multiplexing of audio and video streams, demultiplexing of MPEG streams, and user interface applications. Additional data to a user interface application such as the on-screen display may be provided every 2 seconds.

In the present invention most of the resources in the processing system 50, other than processing unit 58, are partitioned into two sets each of which is dedicated to either the time-critical tasks or the non-time-critical tasks. The non-shaded components in the CPU core 52, i.e., the I-cache 56, register group 62, low priority interrupt controller 66, and data memory 68 are present in the conventional processors. In an embodiment of the present invention shown in FIG. 3, the shaded components, i.e., the code RAM 54, register group 60, high priority interrupt controller 64, and data memory 72 are introduced and integrated with other components in the processing system 50 to perform data-processing efficiently and cost-effectively. Partition of resources allows processing system 50 to perform hw-assisted context switching by recording the status of registers and resources for time-critical and non-time-critical tasks separately. Accordingly, when processing unit 58 receives an interrupt command from a communication system, processing unit 58 does not need to save the registers and the status of other resources before providing service to the communication system as all such information is being updated in processing system 50. Processing unit 58 performs the time-critical task requested by the communication system and resumes executing the non-time-critical task.

More specifically, instructions for the non-time-critical tasks are stored within the I-cache 56 and instructions for the time-critical tasks are stored within the code RAM 54. Processing unit 58 fetches instructions for time-critical and non-time-critical tasks from the code RAM 54 and the I-cache 56, respectively. Accordingly, processing unit 58 fetches all the instructions for executing the interrupt commands from the code RAM 54 rather than from an outside memory thereby enhancing efficiency of data processing.

Register group 60, updates the status of registers related to time-critical tasks and register group 62 updates the status of registers related to non-time-critical tasks. For example, registers updating the status of video compression are located in register group 60 while registers updating the status of audio/video multiplexing are located within register group 62. When an interrupt command is received processing unit 58 reads the registers in register group 60.

Furthermore, each of the two sets of priority interrupt controllers 64 and 66 is dedicated to a particular type of task. Interrupt commands generated by the communication systems are sent to the interrupt controllers. High priority interrupt controller 64 signals processing unit 58 whenever the interrupt command requires execution of time-critical tasks. Similarly, low priority interrupt controller 66 signals processing unit 58 whenever the interrupt command requires execution of non-time-critical tasks. Accordingly, processing unit 58 prioritizes the interrupt commands based on the response time required to provide service. It is noted that the instructions required for providing service to the communication systems for time-critical tasks are stored within the code RAM 54. However, for non-time-critical tasks there are interrupt commands, such as stop or play command generated by a user, that require instructions external to instruction cache 56. Under such circumstances, the I-cache 56 fetches the relevant instructions from an external memory via the D-bus bridge 76.

Similarly, data memory is partitioned to provide data for the two types of tasks separately. Data memory 72 stores data required for executing time-critical tasks and data memory 68 stores data required for executing non-time-critical tasks. For time-critical tasks all the data is stored within data memory 72 to avoid fetching data from an external memory thereby enhancing efficiency of the data processing operation.

Figure 1:
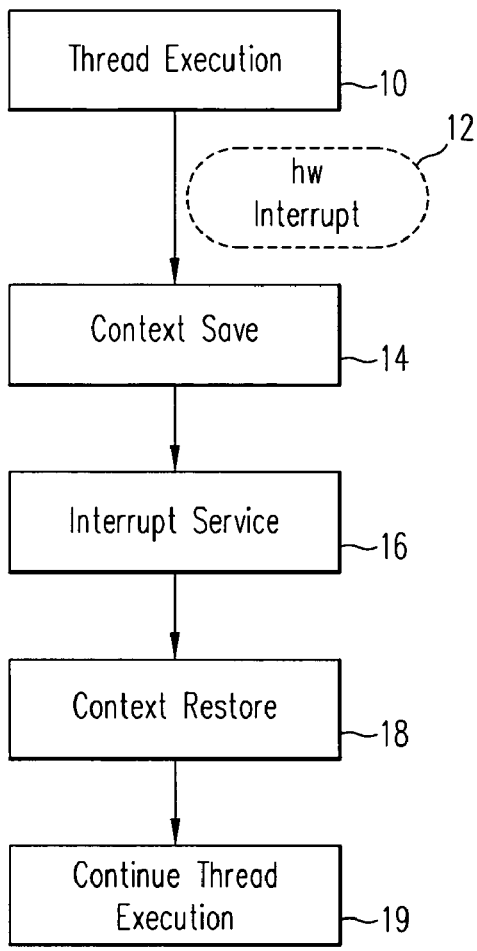
FIG. 1 shows a flowchart for executing an interrupt command by a prior art system having a single processor.
Figure 4:
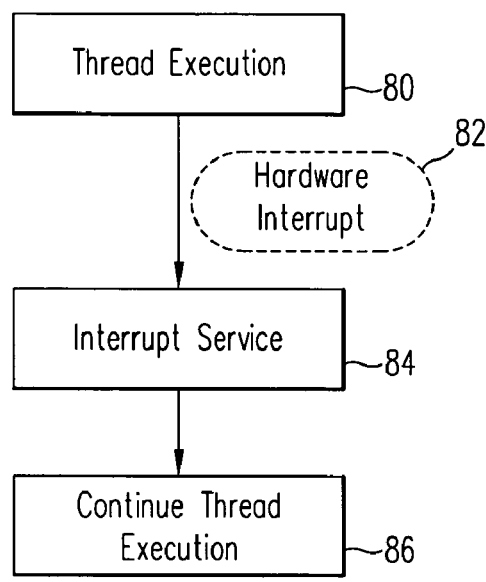
FIG. 4 shows a flowchart for executing an interrupt command, according to an embodiment of the present invention.

Referring now to FIG. 4, a flowchart for executing an interrupt command is shown, in accordance with an embodiment of the present invention. The processing system, being a multi-task system, has the capability of performing a plurality of tasks simultaneously, wherein each of the tasks is referred to as a thread. Execution of a thread starts in step 80. The processing system receives a hardware (hw) interrupt command 82 from the high priority interrupt controller while performing thread execution. The hw interrupt command 82 generated by a communication system requires execution of a time-critical task.

An example of thread execution is multiplexing of audio and video streams, which is a non-time-critical task. In another embodiment of the present invention executing a time-critical task is an example of thread execution. The interrupt command, for example, may be issued by the VEU while compressing video data. The VEU may request more video data for compression. Providing additional video data to the VEU is a time-critical task for which the processing system stops audio/video multiplexing to provide service to the VEU, as indicated in the interrupt service step 84. However, in the present invention, through hw-assisted context switching, status of registers of the communication system requesting service, e.g. the VEU, is being updated according to the information stored in register group 60 (shown in FIG. 3) eliminating the need for saving status of the registers in register group 62. As a result, processing unit 58 only accesses status of the registers in register group 60 for execution of time-critical tasks.

Accordingly, processing unit 58 fetches the necessary instructions from the code RAM 54 to execute time-critical tasks, as shown in interrupt service step 84. In the example considered hereinabove, processing unit 58 provides data to the VEU during interrupt service. Upon completion of the interrupt service, processing unit 58 resumes thread execution, as indicated in step 86. Processing unit 58 is no longer required to restore status of the registers, as required in conventional context switching, since in hw-assisted context switching the status of registers is being updated according to the information stored in register group 60.

Figure 5:
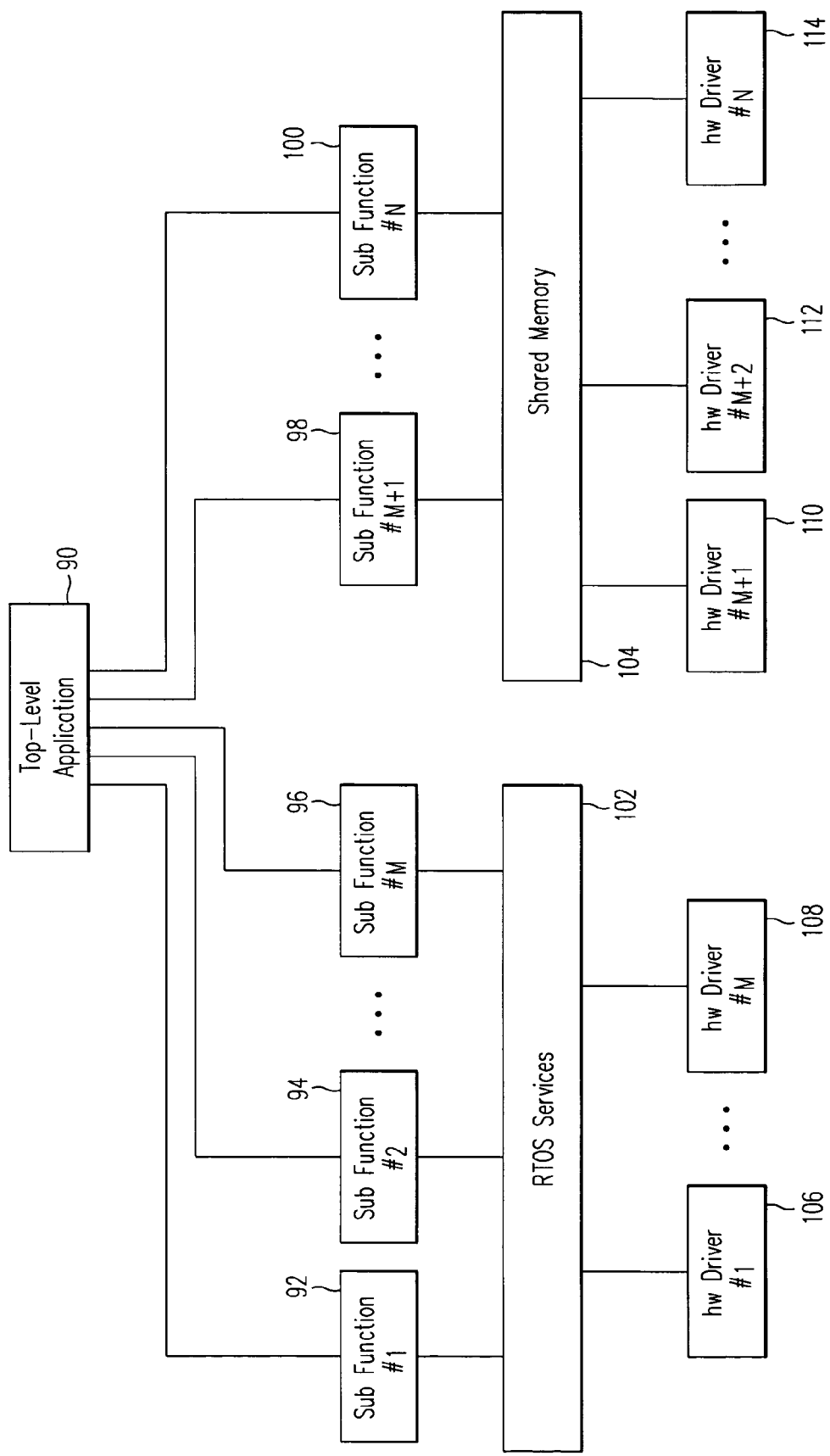
FIG. 5 shows an overall software architecture for a processing system, according to an embodiment of the present invention.

Referring now to FIG. 5, an overall software (sw) architecture for a processing system is shown to include a top-level application 90, a plurality of sub-functions 92–100, real-time operating system (RTOS) services 102, a shared memory 104, and a plurality of hw drivers 106–114, in accordance with an embodiment of the present invention. The overall sw architecture shown in FIG. 5 is implemented within the processing system 50 shown in FIG. 3.

Examples of top-level application 90 include MPEG audio and video encoding and decoding. There are a number of time-critical tasks related to MPEG encoding and decoding that are represented by a plurality of sub-functions such as motion estimation 98 and audio encoding 100. Examples of sub-functions representing non-time-critical tasks include audio/video multiplexing 92, audio/video demultiplexing 94, and transfer of user data from an external memory 96. Sub-functions 92–100, shown in FIG. 5, represent sw programs for implementation of the tasks corresponding to each sub-function.

There are RTOS services 102 such as message queue and memory management provided for non-time-critical tasks. The RTOS services 102 are provided to the units participating in execution of non-time-critical tasks, such as I-cache 56, register group 62, data memory 68, and low priority interrupt controller 66 shown in FIG. 3. However, for time-critical tasks there is no need for RTOS services in the present invention and all the necessary data and instructions are pre-allocated in data memory bank 72, the code RAM 54, and shared memory 104. As a result, the processing system of the present invention may be used with conventional operating systems unlike most of the conventional processors that require high-speed operating systems. The units engaging in execution of time-critical tasks include the code RAM 54, register group 60, data memory 72, and high priority interrupt controller 64.

The hw drivers 106 and 108 represent examples of sw programs that enable the processing system to communicate with other communication systems. For example, if there is a need for the processing system to communicate with a personal computer interface (PCI) bus, a hw driver such as 106 provides the necessary sw allowing communication therebetween. The hw drivers 110–114 also represent sw programs that enable the processing system to communicate with the communication systems of the audio and video codec 20 such as the VEU 24 shown in FIG. 2.

In the present invention the processing unit, comprising the arithmetic-logic unit (ALU) and other computational units, is shared between the time-critical and the non-time-critical tasks. Such an arrangement is possible because the communication systems require a relatively short computational time to be served, i.e., the time-critical and non-time-critical tasks do not require intensive computations. However, the remaining resources in the processing system, such as the instruction and data memory, are partitioned into two separate sets each of which is dedicated to either time-critical or non-time-critical tasks whereby data is processed efficiently and cost-effectively.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A processing core of a processing system, employed in an audio and video encoder/decoder, for performing hardware-assisted context switching, comprising:
    a processing unit;
    an instruction cache for storing instructions for non-time-critical tasks and a code random access memory for storing instructions required for causing serving of time-critical tasks, the instruction cache and the code random access memory coupled to the processing unit;
    a register group for updating status of registers related to time critical tasks; and
    another register group coupled to the processing unit, wherein the processing unit need access status of registers only in the register group for execution of time-critical tasks thereby avoiding saving and restoring status of the another register group for execution of time-critical tasks.

2. The processing core according to claim 1, wherein one of the time-critical tasks is providing additional data to a video engine unit during a video compression process.

3. The processing core according to claim 2, wherein the additional data is provided to the video engine unit within a time interval of less than two microseconds.

4. The processing core according to claim 1, wherein one of the non-time-critical tasks is multiplexing of audio and video streams.

5. The processing core according to claim 1, wherein one of the one-time-critical tasks is demultiplexing Motion Picture Expert Group (MPEG) streams.

6. The processing core according to claim 1, wherein the non-time-critical tasks are user interface application.

7. The processing core according to claim 6, wherein one of the user interface applications is providing an on-screen display every two seconds.

8. A method of processing information using hardware-assisted context switching in an audio and video encoder/decoder, comprising:
    providing a processing unit;
    coupling an instruction cache and a code random access memory to the processing unit;
    coupling a register group and another register group to the processing unit;
    coupling a data memory and another data memory to the processing unit;
    coupling a low priority interrupt controller and a high priority interrupt controller to the processing unit;
    performing non-time-critical tasks through dedicated use by the processing unit of the instruction cache, the register group, the data memory, and the low priority interrupt controller;
    performing time-critical tasks through dedicated use by the processing unit of the code random access memory, the another register group, the another data memory, and the high priority interrupt controller; and
    accessing status of registers only in the register group for execution of time-critical tasks thereby avoiding saving and restoring status of the another registers for execution of time-critical tasks.

9. The method according to claim 8, wherein performing time-critical tasks further comprises providing additional data to a video engine unit during a video compression process.

10. The method according to claim 9, wherein providing additional data further comprises providing the additional data to the video engine unit within a time interval of less than two microseconds.

11. The method according to claim 8, wherein performing non-time-critical tasks further comprises multiplexing of audio and video streams.

12. The method according to claim 8, wherein performing non-time-critical tasks further comprises demultiplexing Motion Picture Expert Group (MPEG) streams.

13. The method according to claim 8, wherein performing non-time-critical tasks further comprises performing user interface applications.

14. The method according to claim 13, wherein performing user interface applications further comprises providing an on-screen display every two seconds.

15. An audio and video encoder/decoder, comprising:
a processing system;
a video engine unit and a video interface unit both coupled to the processing system;
an audio engine unit and an audio interface unit both coupled to the processing system and
wherein the processing system has a processing core that includes:
a processing unit;
an instruction cache for storing instructions for non-time-critical tasks and a code random access memory for storing instructions required for causing serving of time-critical tasks, the instruction cache and the code random access memory coupled to the processing unit;
a register group for updating status of registers related to time critical tasks; and
another register group coupled to the processing unit;
a data memory and another data memory coupled to the processing unit; and
wherein the processing unit need access status of registers only in the register group for execution of time-critical tasks thereby avoiding saving and restoring status of the another registers for execution of time-critical tasks.

16. The audio and video encoder/decoder according to claim 15, wherein one of the time-critical tasks is providing additional data to a video engine unit during a video compression process.

17. The audio and video encoder/decoder according to claim 16, wherein the additional data is provided to the video engine unit within a time interval of less than two microseconds.

18. The audio and video encoder/decoder according to claim 15, wherein one of the non-time critical tasks is multiplexing of audio and video streams.

19. The audio and video encoder/decoder according to claim 15, wherein one of the non-time-critical tasks is demultiplexing Motion Picture Expert Group (MPEG) streams.

20. The audio and video encoder/decoder according to claim 15, wherein the non-time-critical tasks are user interface applications.

21. The audio and video encoder/decoder according to claim 20, wherein one of the user interface applications is providing an on-screen display every two seconds.

* * * * *